(12) United States Patent
Ye et al.

(10) Patent No.: US 8,797,858 B2
(45) Date of Patent: Aug. 5, 2014

(54) ADAPTIVE ACCESS CHANNEL OVERLOAD CONTROL

(75) Inventors: Erning Ye, Kanata (CA); Indranil Bob Tapadar, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 172 days.

(21) Appl. No.: 13/343,526

(22) Filed: Jan. 4, 2012

(65) Prior Publication Data
US 2013/0170343 A1    Jul. 4, 2013

(51) Int. Cl.
*H04W 28/02* (2009.01)
*H04W 28/12* (2009.01)
*H04W 72/04* (2009.01)
*H04W 74/00* (2009.01)
*H04W 48/02* (2009.01)

(52) U.S. Cl.
USPC ........... 370/230; 370/235; 370/252; 370/329; 370/338; 370/341; 455/450; 455/452.2

(58) Field of Classification Search
USPC ......... 370/229, 230, 232–235, 252, 328, 330, 370/338
See application file for complete search history.

(56) References Cited

U.S. PATENT DOCUMENTS

| | | | |
|---|---|---|---|
| 7,924,871 B2 | 4/2011 | Hyslop | |
| 8,045,973 B2 * | 10/2011 | Chambers | 455/422.1 |
| 8,081,974 B2 * | 12/2011 | Fischer et al. | 455/434 |
| 8,340,002 B2 * | 12/2012 | Johansson et al. | 370/282 |
| 8,340,110 B2 * | 12/2012 | Gast | 370/412 |
| 8,385,197 B2 * | 2/2013 | Krym et al. | 370/230 |
| 2004/0165529 A1 * | 8/2004 | Lee | 370/230 |
| 2008/0032714 A1 * | 2/2008 | Suzuki et al. | 455/458 |
| 2009/0219816 A1 | 9/2009 | Rezaiifar | |
| 2009/0270104 A1 * | 10/2009 | Du et al. | 455/436 |

(Continued)

FOREIGN PATENT DOCUMENTS

| | | |
|---|---|---|
| EP | 1 469 698 A2 | 3/2004 |
| EP | 2 222 112 A1 | 2/2010 |
| GB | 2 443 233 A1 | 4/2008 |
| WO | 2011/100540 A1 | 8/2011 |

OTHER PUBLICATIONS

3GPP TS 36.321 V9.6.0 (Mar. 2012), "3rd Generation Partnership Project; Technical Specification Group Radio Access Network; Evolved Universal Terrestrial Radio Access (E-UTRA); Medium Access Control (MAC) Protocol Specification (Release 9)" consisting of 48 pages.

(Continued)

*Primary Examiner* — Candal Elpenord
(74) *Attorney, Agent, or Firm* — Christopher & Weisberg, P.A.

(57) ABSTRACT

A device for use in a communication network having an access channel is provided. The device includes a memory that stores access class ("AC") barring parameters. The AC barring parameters establish rules to determine whether to transmit an access message on the access channel. The device includes a processor that determines whether the access channel is in an overload condition and determines of overload levels in response to the access channel being in an overload condition. A value of at least one AC barring parameter is defined based on the determined one of the plurality of overload levels. The device includes a transmitter that transmits an update message. The update message includes the defined value of the AC barring parameter corresponding to the determined one of the plurality of overload levels.

34 Claims, 6 Drawing Sheets

(56) References Cited

U.S. PATENT DOCUMENTS

| | | | |
|---|---|---|---|
| 2010/0058480 A1* | 3/2010 | Hedberg et al. | 726/26 |
| 2010/0323736 A1* | 12/2010 | Fischer et al. | 455/509 |
| 2012/0039171 A1* | 2/2012 | Yamada et al. | 370/232 |
| 2012/0170503 A1* | 7/2012 | Kelley et al. | 370/312 |
| 2013/0035064 A1* | 2/2013 | Balachandran et al. | 455/411 |

OTHER PUBLICATIONS

3GPP TS 22.011 V9.4.0 (Jun. 2010), "3rd Generation Partnership Project; Technical Specification Group Services and System Aspects; Service Accessibility (Release 9)" consisting of 24 pages.

3GPP TS 36.304 V9.11.0 (Jun. 2011), "3rd Generation Partnership Project; Technical Specification Group Radio Access Network; Evolved Universal Terrestrial Radio Access (E-UTRA); User Equipment (UE) Procedure in Idle Mode (Release 9)" consisting of 32 pages.

3GPP TS 36.331 V9.12.0 (Sep. 2012) 3rd Generation Partnership Project; Technical Specification Group Radio Access Network; Evolved Universal Terrestrial Radio Access (E-UTRA); Radio Resource Control (RRC); Protocol specification (Release 9) consisting of 257-pages.

3GPP TS 25.331 V9.12.0 (Sep. 2012) 3rd Generation Partnership Project; Technical Specification Group Radio Access Network; Radio Resource Control (RRC); Protocol specification (Release 9).

Written Opinion of the International Preliminary Examining Authority dated Jan. 29, 2014 for International Application No. PCT/IB2012/055888, International Filing Date Oct. 25, 2012 consisting of 4-pages.

\* cited by examiner

ADAPTIVE ACCESS CHANNEL OVERLOAD CONTROL

CROSS-REFERENCE TO RELATED APPLICATION n/a

STATEMENT REGARDING FEDERALLY SPONSORED RESEARCH OR DEVELOPMENT n/a

FIELD OF INVENTION

The present invention relates to communication networks, and in particular to a device, system and method for adaptive access channel overload control in a wireless communication network.

BACKGROUND

The use of wireless networks as a communication medium for transferring data has continued to increase as mobile device functionality has improved and wireless network standards have put further emphasis on service related quality. For example, Long Term Evolution (LTE) sets forth standards that provide for increased capacity and link speeds as compared with other communication technologies, and provide specific quality standards for voice and data traffic. In particular, LTE defines Random Access Channel (RACH) procedures that define and control the interaction between a mobile device and a respective eNodeB, i.e., base station, over an access channel.

In particular, a mobile device may initiate RACH procedures for establishing an uplink/download link for data communications. RACH procedures may be used for random access transmission and/or transport of control information. For example, RACH procedures may be initiated to register a mobile device with an eNodeB after mobile device power up, location registration and to initiate services such as placing a call from the mobile device. The RACH procedure may be initiated by transmission of a Random Access (RA) preamble message to the eNodeB. The RA preamble message may include the preamble ID such as a random number chosen from a group of random numbers. In response to receiving the RA preamble message, eNodeB may transmit a RA response (RAR) message including at least one preamble ID, timing alignment information and initial uplink grant, among other data. Receiving the RAR message at the mobile device indicates the end of the RACH procedure, i.e., the RACH procedure was successful, and the beginning of the radio resource control (RRC) connection request procedure. In response, to receiving the RAR message, the mobile device may transmit a RRC connection request message to the eNodeB. For example, the RRC connection request message may be transmitted to the eNodeB via the Physical Downlink Shared Channel (PDSCH) according to the information contained in the RAR message, i.e., uses specific resources and timing information in the RAR message. The RRC connection request message may include mobile device identity and other information. In response to a received RRC connection request, the eNodeB may transmit an RRC connection setup message indicating that mobile device may commence data transfer via the eNodeB, i.e., mobile device is now in an RRC_connected state.

However, problems occur during the RACH procedure and/or during the RRC connection request procedure such as to cause a mobile device to reinitiate the RACH procedure. In particular, several problems may occur during the initiating of the RACH procedure. For example, the RA preamble message may be dropped by the eNodeB due to a Cyclic Redundancy Check (CRC) error or CRC failure. In particular, a CRC error could occur if too many RA preamble messages arrive within the transmission time interval (TTI). Moreover, RA preamble messages may be dropped by the eNodeB when the message rate on the access channel reaches the maximum capacity. Upon determining that the RA preamble messages have been dropped, mobile device may reinitiate the RACH procedure, i.e., retransmit the RA preamble message. If the problem that caused the RA preamble to be dropped still exists, the re-initiation of the RACH procedure may add to the problem, i.e., the eNodeB is already at maximum capacity. Even if the eNodeB receives and processes the RA preamble, the eNodeB may not be able to schedule the RAR messages on the PDSCH due to other pending higher priority activities such as eNodeB paging. The mobile device may re-initiate the RACH procedure if no RAR message is received within a configured window. However, unless the other higher priority activities at the eNodeB have ceased or been completed, re-initiating of the RACH procedure will likely fail again, and may overload the system.

Even if the RACH procedure is successful, i.e., the mobile device receives the RAR message, problems may occur during the RRC connection request procedure. For example, the mobile device may not get any response from the eNodeB within timer T300 in which timer T300 is a predefined length of time that the mobile device will wait to receive the response after transmitting the RRC connection request. In particular, the eNodeB does not transmit the RRC connection setup message within timer T300 due to some other higher priority activity occurring at the eNodeB. Moreover, the eNodeB may reject the RRC connection request message, i.e., admission control may not accept the RRC connection request. In particular, the eNodeB may transmit a RRC connection rejection message during timer T302 in which timer T302 is a predefined length of time that mobile device will wait until retransmission by the mobile device. Mobile device may re-initiate the RACH procedure after expiration of timer T302. For example, the admission control may reject the RRC connection request due to radio link failure (RLF), among other reasons. However, the re-initiated RACH procedure may continue to fail due to RLF, thereby likely overloading the system, i.e., the mobile device continues to re-initiate the RACH procedure.

Moreover, the mobile device may initiate the RACH procedure after being disconnected while in the RRC_connected state, i.e., to reconnect. For example, the mobile device may be disconnected because the mobile device was not granted uplink (UL) resources due to a lack of UL resources and/or no priority on downlink (DL) scheduling. The mobile device may consider the lack of UL grant and no priority on downlink scheduling as RLF, and may re-initiate the RACH procedure. Moreover, expiration of timers such as T304 may cause mobile device to initiate the RACH procedure in which timer T304 is a predefined length of time for completing mobile device handover. However, re-initiating the RACH procedure does not account for the problem that caused the disconnection, i.e., the mobile device continues trying to re-connect via the same RACH procedure, thereby likely creating additional problems at the eNodeB such as reaching maximum capacity. Moreover, re-connection may occur due to problems with timing synchronization, i.e., loss of the timing alignment synchronization. In other words, even after the mobile device is connected, mobile device may still initiate the RACH procedure while in the RRC_connected state.

Known methods for addressing RACH procedure re-initiation include triggering the back-off indication bit in the RAR message to cause all mobile devices to delay transmission of all RA preamble messages to the eNodeB. However, using the back-off indication bit will not work if the eNodeB is unable to first process the RA preamble message, i.e., is unable to transmitted the RAR message. Moreover, such a brute force solution does not differentiate between services. For example, the mobile device may not be able to initiate a 911 call without having to observe the back-off indication bit. Also, using the back off indication bit for all mobile devices does not differentiate between mobile device states such as idle or connected states.

Another known solution is the use of timer T302 in which the mobile device is prevented from sending RA preamble messages until the expiration of the T302 timer, then mobile device may initiate the RACH procedure. However, the mobile device will be informed by the eNodeB only when timer 302 expires such that the mobile device may initiate RACH procedures again. Such a solution does not help reduce RACH overload because mobile devices will still be able to initiate RACH procedures after the timer.

Yet another known solution is the use of an access class barring facility that includes barring parameters that are preset by the operator in a wideband code division multiple access (WCDMA) based network. For example, all mobile devices may operate according to the barring parameters in a WCDMA based network. However, the barring parameters are not adaptable according to the level of access channel overload, i.e., any detected overload, however minimal, will result in the all mobile devices operating according to the same barring parameters.

Accordingly, it is desirable to have a device, system and method that allows for adaptive overload control of the access channel.

SUMMARY

The present invention advantageously provides a device, system and method for access channel overload detection and adaptive control.

According to one embodiment, a device for use in a communication network is provided. The communication network has an access channel. The device includes a memory. The memory stores access class ("AC") parameters in which the AC barring parameters establish rules to determine whether to transmit an access message on the access channel. The device includes a processor in communication with the memory. The processor determines whether the access channel is in an overload condition and determines one of a plurality of overload levels in response to the access channel being in an overload condition. A value of at least one AC barring parameter is defined based on the determined one of the plurality of overload levels. The device includes a transmitter in communication with the processor. The transmitter transmits an update message in which the update message includes the defined value of the at least one AC barring parameter corresponding to the determined one of the plurality of overload levels.

According to another embodiment, a device for use in a communication network is provided in which the communication network has an access channel. The device includes a memory. The memory stores access class ("AC") parameters in which the AC barring parameters provide rules to determine whether to transmit an access message on the access channel. The device includes a processor. The processor determines whether the access channel is in an overload condition. The overload condition is based at least in part on access channel characteristics that indicate whether a user device has been able to establish a communication connection. The device includes a transmitter in which the transmitter transmits a value of at least one AC barring parameter in response to determining whether the access channel is in the overload condition.

According to yet another embodiment, a method of adaptively controlling access channel overload in a communication network. The method includes determining whether an access channel is in an overload condition. The method includes determining a value of at least one access class ("AC") parameter in response to determining whether the access channel is in the overload condition. An update message is transmitted in which the update message includes the determined value of at least one AC barring parameter. The at least one AC barring parameter provides at least one rule to determine whether to transmit an access message on the access channel. The method includes monitoring whether the access channel continues to be in the overload condition after transmitting the update message.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
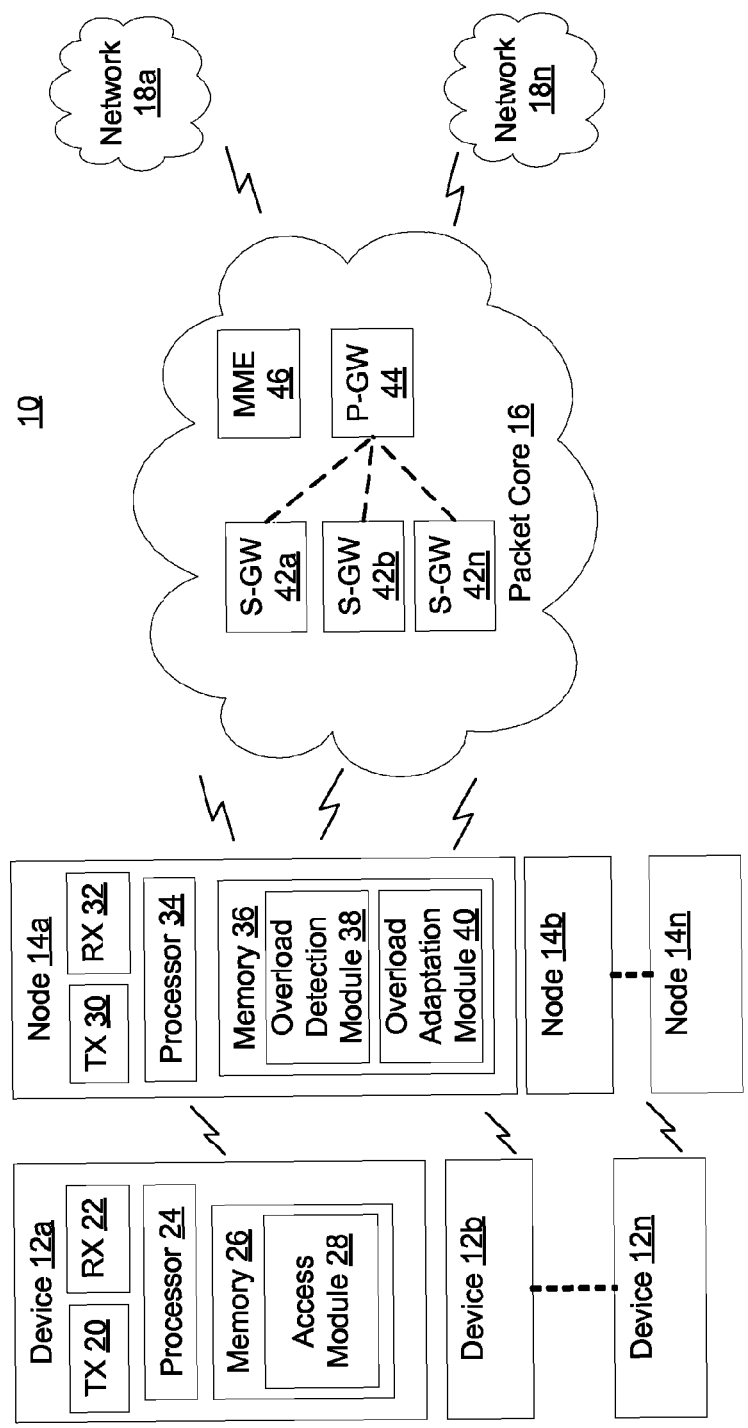
FIG. 1 is a block diagram of a communication system having adaptive access channel control constructed in accordance with the principles of the present invention.

The present invention advantageously provides a device, system and method that allows for access channel overload detection and adaptive access channel control. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Referring now to the drawing figures in which like reference designators refer to like elements there is shown in FIG. 1 an exemplary communication system having adaptive access channel control constructed in accordance with the principles of the present invention and designated generally as "10." System 10 may include one or more devices 12a to 12n (collectively referred to as "device 12"), one or more nodes 14a to 14n (collectively referred to as "node 14"), one or more packet cores 16 (collectively referred to as "packet core 16") and one or more networks 18a to 18n (collectively referred to as "network 18").

Device 12 may include transmitter 20 and receiver 22 for communicating at least with node 14 via a communications network using communication protocols known in the art, e.g., using Internet Protocols along with the LTE standards. For example, the communications network may be a mobile communications network. Device 12 and node 14 may communicate at least via an access channel within the communications network. Device 12 may include processor 24 such as central processing unit (CPU) for performing device functions described herein. Device 12 may include memory 26 that stores access module 28, among other modules. In particular, memory 26 may include non-volatile and volatile memory. For example, non-volatile memory may include a hard drive, flash memory, memory stick and the like. Also, volatile memory may include random access memory and others known in the art. Memory 26 may store program instructions such as those for access module 28. For example, access module 28 includes instructions, which when executed by processor 24, cause processor 24 to perform access channel process, discussed in detail with reference to FIG. 2. Memory 26 may store AC barring parameters and corresponding AC barring values. Device 12 may include mobile devices, tablets, laptops, computers, personal digital assistants (PDAs), servers, long term evolution (LTE) enabled devices and the like.

Node 14 includes transmitter 30, receiver 32, processor 34 and memory 36 in communication with each other. In particular, transmitter 30, receiver 32, processor 34 and memory 36 may generally correspond to the components in device 12, with size and performance being adjusted based on design needs, while providing the functionality described herein with respect to node 14. For example, transmitter 30 and receiver 32 may provide transmission and reception of data communications to/from device 12 and packet core 16, among other communication devices and servers. Memory 36 may store AC barring parameters and corresponding AC barring values overload detection module 38, overload adaptation module 40, among other modules.

Overload detection module 38 performs the process of detecting access channel overload. For example, overload detection module 38 includes instructions, which when executed by processor 34, cause processor 34 to perform the overload detection process, discussed in detail below with respect to FIG. 3. Overload adaptation module 40 performs the process of adaptively controlling device 12 access to the access channel, i.e., controls when device 12 performs the RACH procedure. For example, overload adaptation module 40 includes instructions, which when executed by processor 34, cause processor 34 to perform the access channel overload adaptive process, discussed in detail with respect to FIG. 4. Memory 36 may store AC barring values or set of AC barring values corresponding to one or more AC barring parameters, i.e., store one or more AC barring values that correspond to respective overload levels, as discussed in detail with respect to FIGS. 3-4. In one embodiment, node 14 is a base station such as a LTE eNodeB.

Packet core 16 may be an Internet Protocol (IP) based core network. For example, packet core 16 may be an evolved packet core (EPC) network that is based on end-to-end IP based transmission in and out of EPC network, e.g., all-IP based. For example, data and voice may be communicated through EPC via IP packets. Packet core 16 may include one or more serving gateways 42a to 42n (collectively referred to as "S-GW 42"). S-GW 42 may route and forward user data packets as is well known in the art. Packet core 16 may include packet distribution network gateway 44 (referred to as "P-GW 44"). In particular, P-GW 44 may provide connectivity to external data communication networks such as network 18. P-GW may act as a point of entrance and exit of traffic for the packet core 18 based network. Packet core 18 may include one or more mobile management entities 46 ("MME 46") that may provide control and management of device 12 and node 14. Network 18 may include communication networks such as wide area networks, local area networks and the like. Network 18 may provide various voice and data related services, content and the like to device 12 via packet core 16.

Figure 2:
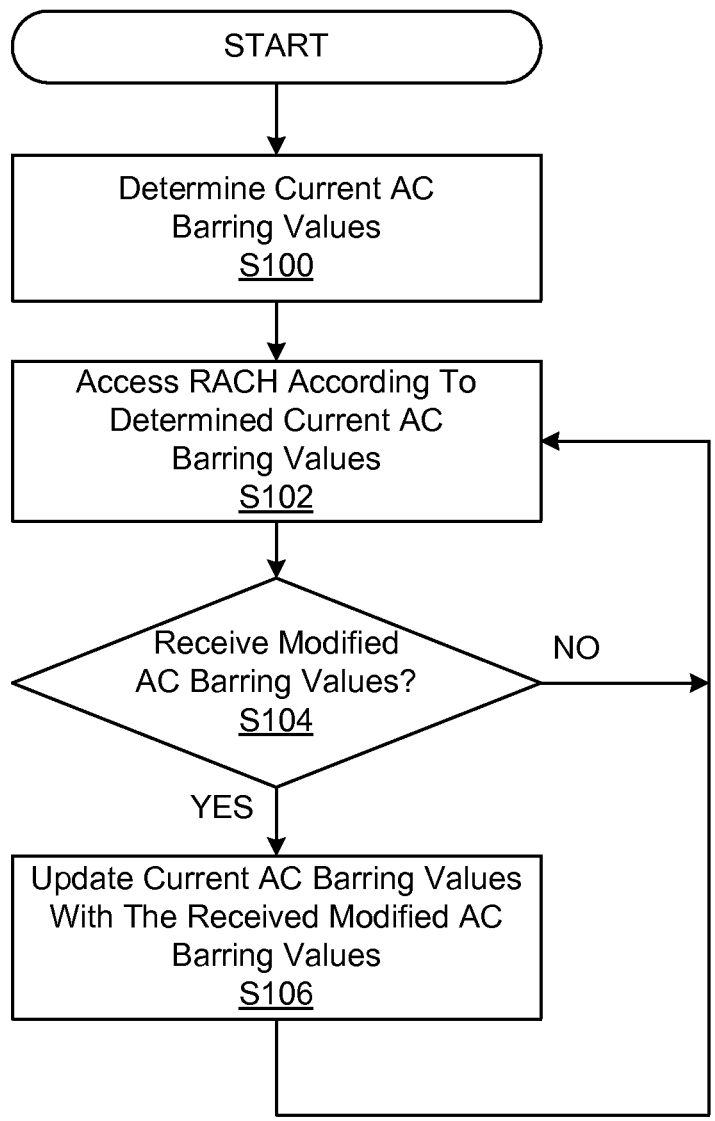
FIG. 2 is a flowchart of an exemplary access channel process in accordance with the principles of the present invention.

An exemplary process for accessing the access channel is described with reference to FIG. 2. Access channel (AC) barring values may be determined at device 12 (Step S100). In particular, device 12 may receive broadcast information and paging messages from node 14 indicating broadcast information change, e.g., modified AC barring values, that correspond to respective AC barring parameters as discussed with reference to FIGS. 4-6. AC barring parameters establish rules to determine when device 12 may access the access channel, i.e., when device can perform or initiate the RACH procedure. AC barring parameters include barring factors, AC barring times and allowed service priority levels. In particular, the AC barring parameter having one or more AC barring values that indicate whether device 12 may perform the RACH procedure according to the AC barring parameter. For example, one or more AC barring values may indicate that the maximum number of RA preamble transmission by device 12 is one preamble transmission during a respective time period. In yet another example, one or more AC barring values may indicate that the service priority level is at a specified service value or service level, i.e., some or all services provided by system 10 have a respective service value or service level in which only services meeting a service priority level are allowed to operate on system 10.

Figure 4:
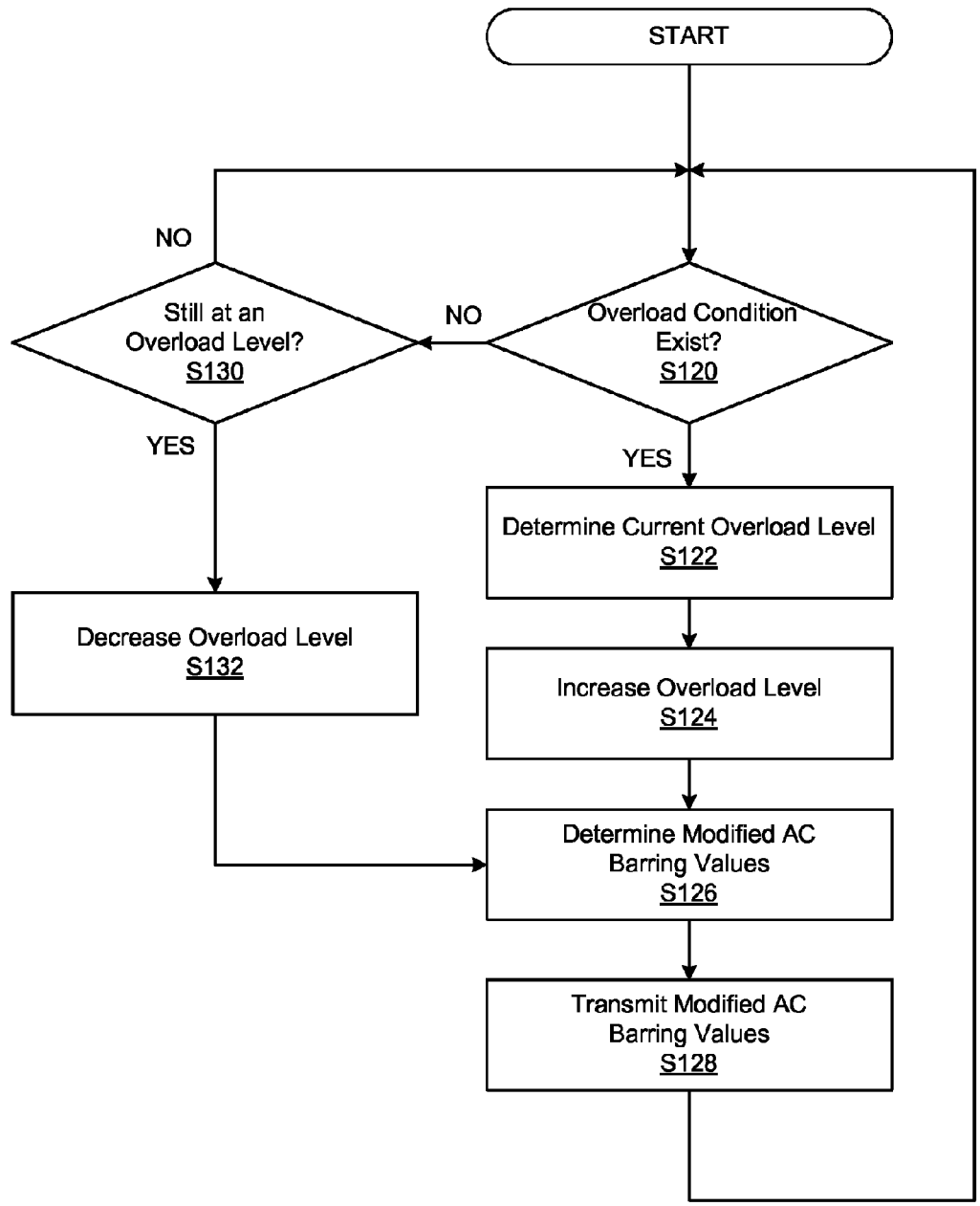
FIG. 4 is a flowchart of an exemplary access channel overload adaptation process in accordance with the principles of the present invention.

The AC barring values may include modified AC barring values as described in detail with respect to FIG. 4. Device 12 transmits on the access channel according to the AC barring values broadcast by node 14, i.e., accesses the access channel according to broadcast AC barring values (Step S102). For example, device 12 may perform the RACH procedure according to the broadcast AC barring values when device 12 is initiating access with node 14, when device 12 is reestablishing a connection after radio link failure (RLF) and at other times when device 12 is idle. An idle mobile device may include a mobile device in a radio resource control (RRC) idle state (RRC_idle). In particular, device 12 in a RRC_idle state may indicate that device 12 is not connected to node 14, e.g., has not yet transitioned to a RRC connected (RRC_connected) state such as to transmit and receive service related data. The device may include a mobile device in an RRC_connected state but that has lost connection, lost timing alignment synchronization or is in a handover procedure to another node such that the mobile device will transition back to an RRC_idle after a predefined time period. Reestablishing connection being in a handover procedure to another node or reestablishing timing alignment synchronization includes initiating RACH procedures such as transmitting a RA preamble message.

Device 12 determines whether modified AC barring values have been received (Step S104). For example, device 12 may receive modified AC barring values from node 14 in which device 12 may compare the received modified AC barring values with current AC barring values stored in memory 26. If the received modified AC barring values are different AC barring values, e.g. different from the current AC barring values, device 12 may update the current AC barring values with the received modified AC barring values (Step S106). For example, device 12 transitions from the RRC_idle state to the RRC_connected state according to the current AC barring values stored in memory 26 or reestablish connection according to current AC barring values while in an RRC_connected state.

An exemplary access channel overload detection process is described with reference to FIG. 3. Node 14 may determine at least one overload threshold rule (Step S108). Alternatively, the at least one overload threshold rule may be determined by MME 46, S-GW 42 and/or other devices or servers. The at least one overload threshold rule may include a random access channel (RACH) occupancy rule, cyclic redundancy check (CRC) rule, random access response (RAR) failure rule, among other access channel rules. For example, the RACH occupancy rule may be the ratio of received messages to the total capacity in a predefined sample period (Occupancy_Sample). The received messages include the number of valid RA preamble messages that pass CRC and the number of RA preamble messages that failed CRC. In one embodiment, the received messages are the sum of the number of valid RA preamble messages and the number of RA preamble messages that failed CRC over the predefined sample period. The total capacity in a predefined sample period may be the total number of messages that may be received at node 14 per second, multiplied by the number samples in the predefined sample period. For example, 300 RA preamble messages may be received at node via the access channel per second (300/second) in which the sample period is four seconds such that the total capacity in a predefined sample period is 1200 messages.

The access channel rules may include a CRC rule such as a number of messages that fail CRC. For example, the messages failing CRC may include the number of RA preamble messages that failed CRC over the predefined sample period (Failed_CRC_Sample). In particular, the predefined sample period used to determine CRC rule values may be the same as the predefined sample period used to determine RACH occupancy rule values, e.g., a predefined sample period of four seconds. Alternatively, the predefined sample period used to determine the CRC rule values and the RACH occupancy rule values may be different.

In particular, failure to meet the CRC may be caused by one or more factors. For example, messages that fail the CRC may be caused by several RA preamble messages arriving at node 14 at the same time even though the access channel is not in an overload condition, i.e., no overload condition exist. In another example, messages that fail the CRC may be caused by RA preamble message collision due to an access channel overload condition, i.e., overload condition exist. In yet another example, messages that fail the CRC may be caused by poor uplink radio frequency (UL RF) conditions such as a degraded uplink between device 12 and node 14.

The access channel rules may include the RAR failure rule. For example, the RAR failure rule may include a total number of RAR message failures divided by the total valid messages in a predefined sample period (Failed_RAR_Sample). In particular, the total number of RAR message failures may include the number of RAR messages that include a triggered backoff indication, the number of RAR messages that could not be scheduled and other RAR failure characteristics. In one embodiment, the total RAR message failures is equal to the sum of the number of RAR messages including a triggered back-off indication and the number of RAR messages that could not be scheduled by node 14. The total valid messages in a predefined sample period may be the same as described with respect to the RACH occupancy rule. The predefined sample period for determining the RAR failure rule may be the same or different as the predefined sample period for determining the RACH occupancy rule and/or the CRC rule, e.g., predefined sample period of four seconds.

After the at least one overload threshold rule is determined, the overload criteria may be determined (Step 110). In particular, overload criteria may define at least one overload threshold rule value that must be reached in order to determine that an overload condition exists. For example, the overload criteria may define an overload condition to exist when the RACH occupancy rule value and CRC rule value exceed one or more overload threshold rule values. The overload threshold rule values for the RACH occupancy rule to meet the overload criteria may be greater than 50 percent (Occpancy_Sample exceeds 50%), i.e., total received messages divided by total capacity in a predefined sample period exceeds 50 percent. The overload threshold level rule value for the CRC characteristics to meet the overload criteria may be 45 percent (Failed_CRC_Sample exceeds 45%), i.e., total number of messages that fail the CRC divided by the total number of received messages in a predefined sample period exceeds 45 percent. Alternatively, other overload threshold rule values may be used as defined by the network administrator and/or based on past overload threshold rule values, e.g., 35 or 60 percent. In one embodiment, node 14 may define an overload condition to exist when Occupancy_Sample exceeds 50% and Failed_CRC_Sample exceeds 45%.

The overload criteria may define that an overload condition to exist when the RAR failure rule value reaches a predefined overload threshold rule value. For example, the RAR failure rule value required to meet the overload criteria may be 30 percent (Failed_RAR_Sample exceeds 30%), i.e., total RAR message failures divided by the total number of valid messages in a predefined sample period exceeds 35 percent. Alternatively, other overload threshold rule values may be used as defined by the network administrator and/or based on past or historic overload threshold rule values, e.g., 35 or 60 percent. Continuing the example, node 14 may define an overload condition to exist when Failed_RAR_Sample exceeds 35%. In other words, node 14 may define an overload condition to exist when Failed_RAR_Sample exceeds 35%, when the Occupancy_Sample exceeds 50% and Failed_CRC_Sample exceeds 45%, and/or when other access channel rule values meet at least one overload threshold rule value defined by the overload criteria. Alternatively, the overload criteria may define an overload condition to exist when other overload threshold rule values are met.

After node 14 determines the overload criteria, node 14 monitors the access channel to determine access channel characteristics, i.e., monitors device 12 access to the access channel such as monitoring the RACH procedure (Step S112). Access channel characteristics may include total valid messages received, number of RA preamble messages that failed the CRC, number of valid RA preamble messages and total number of RAR message failures among other characteristics that are used to determine the overload threshold rule values. For example, node 14 monitors the total valid messages received at node 14 over the predefined sample period. In particular, node 14 may continuously sample the access channel to determine access channel characteristics. For example, node 14 may determine whether to update the overload criteria (Step S114). In particular, the overload criteria may be updated based at least in part on a number of past instances of the overload criteria being met. Node 14 may determine that the at least one overload threshold rule value in the overload criteria needs to be raised due to the number of past overload conditions exceeding a predefined update level. For example, the overload threshold rule value in the overload criteria may have been defined too low in Step S110 such that the number of past overload conditions exceed the predefined update level. The predefined update level may be defined by the network administrator. Continuing the example, node 14 may raise the overload threshold rule value for Failed_RAR_Sample from 35% to 45%. Alternatively, node 14 may lower or keep the same one or more overload threshold rule value in the overload criteria.

Node 14 may determine whether the overload criteria are met, i.e., overload threshold value met or exceeded (Step S116). For example, node 14 may determine, based at least in part on the monitored access channel characteristics, that both the Occupancy_Sample exceeds 50% and Failed_CRC_Sample exceeds 45%, i.e., the samples exceed at least one overload threshold value in the overload criteria. Alternatively or in addition to, node 14 may determine, based at least in part on the monitored access channel characteristics, that Failed_RAR_Sample exceeds 30%, i.e., the sample exceeds at least one overload threshold rule value in the overload criteria. In response, to determining that the overload criteria is met, node 14 may determine that an overload condition exist (Step S118). In particular, the existence of an overload condition may indicate that node 14 is receiving more messages, e.g., RA preamble messages, than it can process or schedule such as to effect services provisioning in system 10.

An exemplary overload adaptation process is described with reference to FIG. 4. Node 14 determines whether an overload condition exists (Step S120). In particular, node 14 may determine whether an overload condition exist as discussed with respect to Step S118. If node 14 determines an overload condition exists, node 14 determines the current overload level (Step S122). In particular, node 14 may be operating in one of a plurality of overload levels in which each overload level defines at least one value of at least one access channel (AC) parameter. For example, the plurality of overload levels may correspond to overload levels 0-3 with overload level 0 being a non-overload level. Higher overload levels restrict device 12 access to the access channel more than lower overload levels, i.e., overload level 2 restricts initiation of RACH procedure or access to the access channel more than overload level 1.

For example, overload level 0 may define a set of values of at least one AC barring parameter (Normal_AC values). The Normal_AC values may be transmitted to device 12, as discussed with reference to Step S126, such as to allow device 12 to access to the access channel or initiate the RACH procedure according to normal LTE operating principles. In particular, Normal_AC values may allow device 12 to access to the access channel without restrictions and without delay.

Overload level 1 may define a set of values of at least one AC barring parameter (Special_AC_Barring values). The Special_AC_Barring values may be transmitted to device 12, as discussed with reference to Step S126, such as to prevent device 12 from accessing the access channel or initiating the RACH procedure for certain services. Special_AC_Barring values may prevent device 12 from transmitting RA preamble messages to node 14 for services that fall below a service priority level defined at least in part by Special_AC_Barring values. Each service offered in system 10 may have a corresponding specific service priority level. For example, 911 call services may have a higher service priority level than video streaming services. Continuing the example, the Special_AC_Barring values may prevent device 12 from accessing the access channel to initiate downloading or streaming of videos but may continue to allow device 12 to access the access channel to place 911 calls. The Special_AC_Barring parameters may prevent device 12, that is reestablishing a RRC connection, in the handover procedure or reestablishing timing alignment synchronization, from accessing the access channel to initiate certain services. In particular, device 12, in the RRC_connected state but with a failed connection or in a handover procedure, may be prevented from transmitting RA preamble messages for services that fall below a service priority level defined at least in part by Special_AC_Barring values. The same service priority level for device 12 in an RRC_idle state may be used for device 12 that is reestablishing connection with node 14. Special_AC_Barring values may prevent device 12 from accessing the access channel in order to reestablish RRC connection, perform the handover procedure or reestablish timing alignment synchronization for video streaming or downloading but may allow device 12 to access RACH for 911 calls. In other words, Special_AC_Barring values allow device 12 to continue to access the access channel to initiate services meeting a specific service priority level such as time alignment and device 12 handover to another node 14, among other communication related services. Special_AC barring values allow device 12 to continue to access the access channel or initiate RACH procedure for certain priority services while adaptively reducing the overload.

Overload level 2 may define a set of values of at least one AC barring parameter (Barring_Time values). The Barring_Time values may be transmitted to device 12, as discussed with reference to Step S126, such as to allow device 12 to access the access channel for certain services but access the access channel at a slower rate. In particular, Barring_Time values may allow device 12 to initiate the RACH procedure for services meeting a specific service priority level but limit the rate at which device 12 accesses the access channel or initiates the RACH procedure. For example, device 12 in an RRC_idle state or RRC_connected state may add delay to subsequent RA preambles message transmission such that RA preamble transmission occurs less often within a predefined time, i.e., device 12 accesses the access channel at a lower rate or less often. In the RRC_connected state, mobile device 12 may be attempting to reestablish connection, be in the handover procedure or reestablishing timing alignment synchronization. The specific service priority level defined in Barring_Time values may correspond to the same priority level defined Special_AC_Barring, i.e., device 12 will be allowed to access the access channel or initiate the RACH procedure to initiate voice calls meeting the specific service priority level but device 12 will transmit RA preamble messages at a lower rate. Alternatively, Barring_Time values may define at least one different service priority level than Special_AC_Barring values. For example, Barring_Time values may allow device 12 to access the access channel to initiate 911 call services without any added delay but may add delay for other voice call services, i.e., Barring_Time values define 911 call services to have a higher service priority level than other voice call services such that the rate is not lowered for all call services. Barring_Time values allow device 12 to continue to access the access channel while, for certain priority services, adaptively reducing overload on the access channel.

Overload level 3 may define a set of values of at least one AC barring parameter (Barring_Factor_values). The Barring_Factor values may be transmitted to device 12, as discussed with reference to Step S126, such as to prevent device 12 from accessing the access channel or initiating the RACH procedure when a random number chosen by device 12 is lower than a barring threshold defined in Barring_Factor, i.e., prevent device 12 from performing the RACH procedure. In particular, device 12 that is in an RRC_idle state, reestablishing RRC connection, in a handover procedure or reestablishing timing alignment synchronization may select a five bit random number before transmitting a RA preamble message. If the selected five bit random number is equal to or lower than the barring threshold defined by Barring_Time values, then device 12 will not access the access channel or perform the RACH procedure, i.e., barring threshold corresponds to a predefined five bit number. However, if the selected five bit random number is greater than the five bit random defined by Barring_Time values, then device 12 will be allowed to access the access channel or perform the RACH procedure. The range of values from which device 12 selects the random number may be defined by the network administrator and/or in a communication standard or specification such as 3GPP TS 36.311.

Moreover, some or all of the overload levels may include the set of values of at least one AC barring parameter corresponding one or more lower overload levels. For example, overload level 2 may include Barring_Time values, Special_AC_Barring values and Normal_AC values such that overload level 2 restricts access to the access channel more than overload level 1. In yet another example, overload level 3 may include Barring_Factor values, Barring_Time values, Special_AC_Barring values and Normal_AC values such that overload level 3 restrict access to the access channel more than overload levels 1 and 2. If the AC barring values defined by higher overload levels conflict with AC barring values defined by lower overload levels, device 12 may use the AC barring values corresponding to the higher overload levels for the conflicting values. For example, some Normal_AC values may conflict with some Special_AC_Barring values such that device 12 will use Special_AC_Barring values for the conflicting AC barring values.

After node 14 determines the current overload level, node 14 increases the overload level (Step S124). In particular, node 14 may increase the overload level one level at a time or several levels at a time and/or to a specified overload level. For example, node 14 may increase the overload level to overload level 3 regardless of the current overload level. Continuing the example, node 14 determines the current overload level to be overload level 1 in which the overload level is increased to overload level 3. In another example, the current overload level may be increased from overload level 0 directly to overload level 3, skipping overload levels 1-2. Increasing the current overload level by several levels at a time may reduce the length of time system 10 continues to be in an overload condition, i.e., the more restrictive overload level may reduce overload faster than less restrictive overload levels. Alternatively, the current overload level may be increased by one overload level at a time, e.g., increase overload level from 0 to 1, from 1 to 2 and/or from 2 to 3. Increasing the overload level one level at a time allows system 10 to gradually restrict access to the access channel if the system continues to be in an overload condition, i.e., overload was caused by a spike in traffic such that only minimal restrictions to the access channel are needed. Alternatively, the current overload level may be increased by one or more overload levels based in part on the current overload level. For example, node 14 may increase the current overload level from overload level 0 to overload level 1 and/or from overload level 1 directly to overload level 3, i.e., the amount of overload level increase is based at least in part on the current overload level. A network administrator may predefine the amount of overload level increase from one overload level to another and/or the amount of overload increase may be based at least in part on past or historical overload level data stored in memory 36. For example, system 10 may determine that overload level 3 is rarely used such that the current overload level will only be increased to overload level 3 from overload level 2, i.e., system 10 does not skip at least overload level 2.

Node 14 may determine modified AC barring values based at least in part on the current overload level, i.e., the current over load level after the overload level increase or decrease in Steps S124 or S132 (Step S126). Modified AC barring values may correspond to a set of values of at least one AC barring parameter defined by each overload level, as discussed above with respect to Step S122. For example, node 14 may determine that current overload level 2 corresponds to modified AC barring values including both Barring_Time values, Special_AC_Barring values and Normal_AC values. Node 14 may transmit the determined modified AC barring values to device 12 (Step S128). For example, node 14 may broadcast the modified AC barring values to all devices 12 within transmission and reception range of node 14 such that device 12 initiates the RACH procedure according to the broadcast modified AC barring values as discussed with respect to FIG. 2.

Referring back to Step S120, if no overload condition exists, node 14 may determine whether node 14 is still at an overload level (Step S130). In particular, if node 14 is not at an overload level, the determination of Step S120 may be repeated. However, if node 14 is determined to still be at an overload level, the overload level may be decreased (Step S132). For example, even though node 14 is not in an overload condition such that no overload condition exist, node 14 may still be in the process of recovering from an overload condition. The overload level may be decreased by one or more overloads in which the amount of overload level decrease may be based at least in part on the current overload level and/or may be set by a network administrator, as described above with respect to Step S124 with decreasing of overload levels instead of increasing. For example, the overload level may be decreased from overload level 2 to overload level 1 and/or from overload level 1 to overload level 0, e.g., non-overload level. Alternatively, the overload level may be decreased by more than one overload level, e.g., may decrease from overload level 3 to overload level 1. System 10 may adaptive transition to less restrictive overload levels during overload recovery based at least in part on whether the overload condition continues to exist.

An exemplary example of the overload adaptation process is described with reference to FIG. 5. In particular, the overload adaption process may include four overload levels (0-3) with overload level 0 being a non-overload level. At time t=0, node 14 may determine that no overload condition exists at node 14, e.g., node 14 performs the overload detection process of FIG. 3 to determine whether an overload condition exists. In response to determining no overload level exist, node 14 may decrease the overload level, i.e., set the current overload level to overload level 0 or allow the current overload level to remain at overload level 0. During time t=0 to t=A, node 14 may broadcast modified AC barring values corresponding to overload level 0, i.e., device will access the access channel or perform the RACH procedure according to the broadcast modified AC barring values corresponding to overload level 0.

Figure 3:
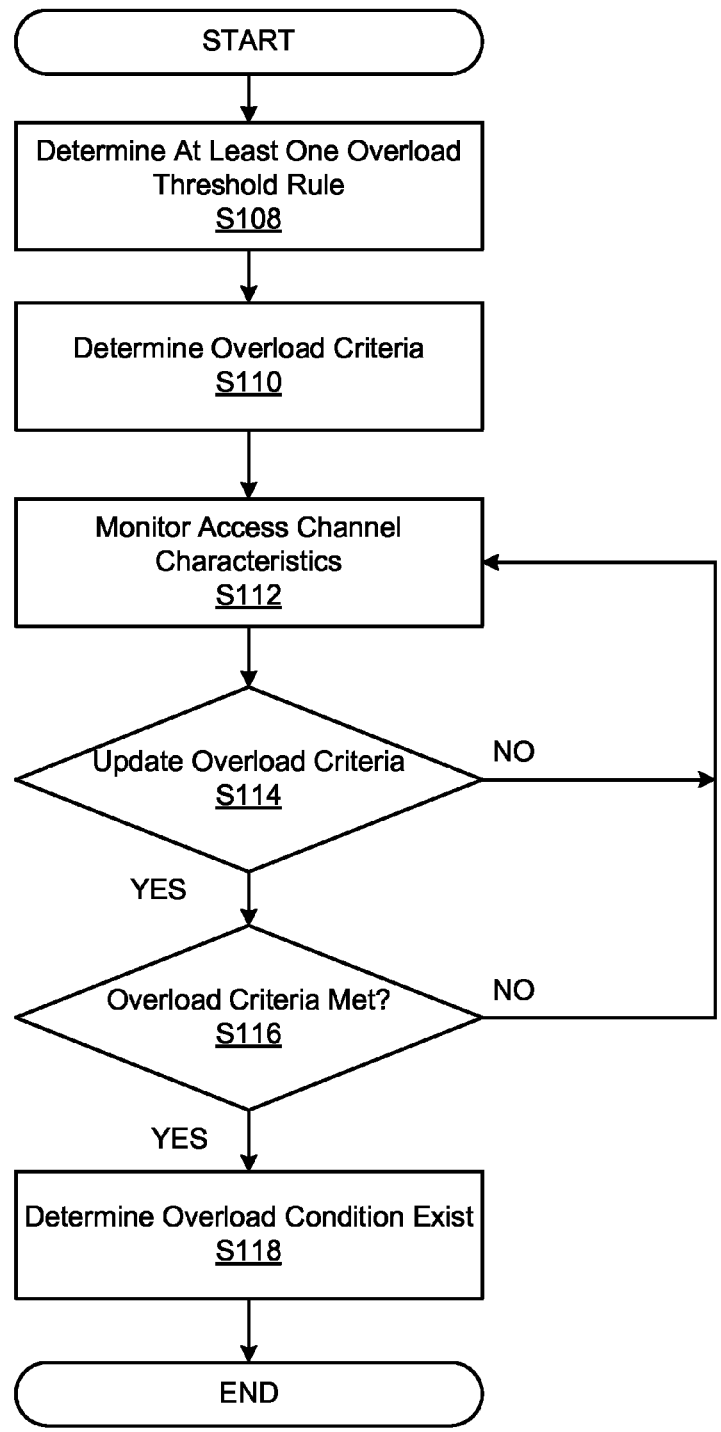
FIG. 3 is a flowchart of an exemplary access channel overload detection process in accordance with the principles of the present invention.

At time t=A, node 14 may determine that an overload condition exists, e.g., node 14 performs the overload detection process of FIG. 3 to determine whether an overload condition exists. In response to determining an overload condition exists, node 14 may increase the current overload level from overload level 0 directly to overload level 3. During time t=A to t=B, node 14 may broadcast modified AC barring values corresponding to overload level 3, i.e., device 12 will access the access channel or initiate the RACH procedure according to the broadcast modified AC barring values corresponding to overload level 3. At time t=B, node 14 may determine that no overload condition exists, e.g., node 14 performs the overload detection process of FIG. 3 and determines that the overload criteria at Step S116 is not met. In response to determining an overload condition does not exist, the current overload level may be decreased from overload level 3 to overload level 2. During time t=B to t=C, node 14 may broadcast modified AC barring values corresponding to overload level 2, i.e., device 12 will access the access channel or initiate the RACH procedure according to the broadcast modified AC barring values corresponding to overload level 2.

At time t=C, node 14 may determine that no overload condition exists, e.g., node 14 performs the overload detection process of FIG. 3 and determines the overload criteria at Step S116 are not met. In response to determining that an overload condition does not exist, the current overload level may be decreased from overload level 2 to overload level 1. During time t=C to t=D, node 14 may broadcast modified AC barring values corresponding to overload level 1, i.e., device 12 will initiate the RACH procedure according to the broadcast modified AC barring values corresponding to overload level 1. At time t=D, node 14 may determine that no overload condition exists, e.g., node 14 performs the overload detection process of FIG. 3 and determines the overload criteria at Step S116 are not met. In response to determining that an overload condition does not exist, the current overload level may be decreased from overload level 1 to overload level 0 or the non-overload level. During time t=D to the beginning of the next time slot, node 14 may broadcast modified AC barring values corresponding to overload level 0 or a non-overload level, i.e., device 12 will access the access channel according to the broadcast modified AC barring values corresponding to overload level 0. In particular, the modified AC barring values corresponding to overload level 0 may allow device 12 to access the access channel or initiate the RACH procedure as needed regardless of service priority level and with no added delay. The determination of whether an overload condition exists may occur one or more times in between designated times depending on the sample period. For example, a time slot such as from time t=A to t=B may allow for several sample periods during the time slot such that any sample period may trigger the overload adaption process of FIG. 4.

Another exemplary example of the overload adaptation process is described with reference to FIG. 6. In particular, the overload adaptation process at time t=0, A, B and C occurs as described with respect to corresponding times in FIG. 5. However, at time t=D, node 14 determines that an overload condition exist, e.g., node 14 performs the overload detection process of FIG. 3 to determine whether an overload condition exists. In response to determining that an overload condition exists, node 14 may increase the current overload level from overload level 1 directly to overload level 3. For example, any increase in the overload level may correspond to setting the current overload level to overload level 3. During time t=D to t=E, node 14 may broadcast modified AC barring values corresponding to overload level 3, i.e., device 12 will access the access channel or initiate the RACH procedure according to the broadcast modified AC barring values corresponding to overload level 3. At time t=E, node 14 determines that the overload condition still exists. In response to determining an overload condition exist, node 14 may increase the current overload level or may set the current overload level to overload level 3. During time t=E to t=F, node 14 may broadcast modified AC barring values corresponding to overload level 3, i.e., device 12 will access the access channel according to the broadcast modified AC barring values corresponding to overload level 3. At times t=F, G and H, node 14 determines that that no overload condition exists, e.g., by performing the overload detection process of FIG. 3. In response to determine no overload condition exists, node 14 may decrease the current overload level, e.g., decrease from overload level 3 to overload level 2 at time t=F or from overload level 1 to overload level 0 at time t=H. In other words, system 10 may adaptively control device 12 access to the access channel or initiation of the RACH procedure by changing the current overload level of system 10 and broadcasting corresponding modified AC barring values to device 12.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A device for use in a Long Term Evolution (LTE) communication network, the LTE communication network having an access channel, the device comprising:

a memory, the memory storing access class ("AC") barring parameters, the AC barring parameters establishing rules allowing access to the access channel of the LTE communication network at a reduced access rate for at least one service, the AC barring parameters including a parameter to establish service based limitations that limit a rate at which lower priority services are accessed while still allowing access to services with a priority greater than the lower priority services;

a processor in communication with the memory, the processor:
  determining whether the access channel is in an overload condition;
  determining one of a plurality of overload levels in response to the access channel being in an overload condition, a value of at least one AC barring parameter being defined based on the determined one of the plurality of overload levels; and
a transmitter in communication with the processor, the transmitter transmitting an update message, the update message including the defined value of the at least one AC barring parameter corresponding to the determined one of the plurality of overload levels.

2. The device of claim 1, wherein the plurality of overload levels are ranked from a lowest overload level to a highest overload level, higher overload levels restricting access to the access channel more than the lower overload levels.

3. The device of claim 2, wherein the plurality of overload levels includes a first overload level that prevents the transmission of an access message based on a service type, the value of at least one AC barring parameter being defined by the first overload level to prevent the transmission of the access message.

4. The device of claim 3, wherein the plurality of overload levels includes a second overload level that increases the amount of time between the transmission of access messages, the second overload level being at a higher overload level than the first overload level, the value of at least one AC barring parameter being defined by the second overload level to increase the amount of time between the transmission of the access messages.

5. The device of claim 4, wherein the processor further includes:
  determining whether the access channel continues to be in the overload condition after transmission of the update message;
  increasing the overload level in response to the access channel still being in the overload condition after a first predefined time window; and
  decreasing the overload level in response to the access channel no longer being in the overload condition after a second predefined time window.

6. The device of claim 5, wherein the increasing and decreasing of the overload level continues until the overload level changes to the lowest overload level, the lowest overload level corresponds to a non-overload level, a value of at least one AC barring parameter being defined by the non-overload level.

7. The device of claim 1, wherein the overload condition is based at least in part on access channel characteristics indicating whether a user device in the LTE communication network has been able to establish a communication connection.

8. The device of claim 7, wherein the access channel characteristics include at least one of a ratio of received messages to access channel capacity, a number of messages failing a cyclic redundancy check ("CRC") and a number of random access response ("RAR") message failures.

9. The device of claim 8, wherein the access channel is in the overload condition when the ratio of receive messages to access channel capacity exceeds a first predefined value and the number of messages failing the cyclic redundancy check exceeds a second predefined quantity.

10. The device of claim 8, wherein the access channel is in the overload condition when the number of random access response message failures exceeds a third predefined quantity.

11. A device for use in a Long Term Evolution (LTE) communication network, the LTE communication network having an access channel, the device comprising:
  a memory, the memory storing access class ("AC") barring parameters, the AC barring parameters establishing rules allowing access to the access channel of the LTE communication network at a reduced access rate for at least one service, the AC barring parameters including a parameter to establish service based limitations that limit a rate at which lower priority services are accessed while still allowing access to services with a priority greater than the lower priority services;
  a processor, the processor:
    determining whether the access channel is in an overload condition, the overload condition being based at least in part on access channel characteristics indicating whether a user device has been able to establish a communication connection; and
  a transmitter, the transmitter transmitting a value of at least one AC barring parameter in response to determining whether the access channel is in the overload condition.

12. The device of claim 11, wherein the access channel characteristics include at least one of a ratio of received messages to access channel capacity, a number of messages failing a cyclic redundancy check ("CRC") and a number of random access response ("RAR") message failures.

13. The device of claim 12, wherein the memory further stores an overload criteria, the overload criteria defining minimum AC barring parameter values, the overload criteria being met when the ratio of total received messages to access channel capacity exceeds a first minimum AC barring parameter value and the number of messages failing the cyclic redundancy check ("CRC") exceeds a second minimum AC barring parameter value; and
  the overload criteria is met when the number of random access response ("RAR") message failures exceed a third minimum AC barring parameter value.

14. The device of claim 11, wherein the memory further stores a plurality of overload levels, each overload level corresponding to a value of at least one AC barring parameter; and
  the processor further determines a current overload level of the access channel from among the plurality of overload levels.

15. The device of claim 14, wherein the plurality of overload levels are ranked from a lowest level to a highest level, each overload level including a value of at least one AC barring parameter of an immediately preceding lower overload level.

16. The device of claim 15, wherein the processor further changes the overload level based at least in part on whether the overload condition is met, the overload level being changed until the lowest overload level is reached, the lowest overload level corresponding to a non-overload level.

17. The method of claim 14, further comprising increasing the overload level when the monitoring indicates the access channel is still in the overload condition.

18. The method of claim 17, further comprising decreasing the overload level when the monitoring indicates the access channel is no longer in the overload condition.

19. The method of claim 18, wherein increasing and decreasing of the overload level based on the maintaining occurs until the lowest overload level is reached, the lowest overload level corresponding to a non-overload level, a value of at least one AC barring parameter being defined based on the non-overload level.

20. The device of claim 12, wherein the memory further stores an overload criteria, the overload criteria defining minimum AC barring parameter values, the overload criteria being met when the ratio of total received messages to access channel capacity exceeds a first minimum AC barring parameter value and the number of messages failing the cyclic redundancy check ("CRC") exceeds a second minimum AC barring parameter value.

21. The device of claim 20, wherein the total received messages include at least a sum of a number of valid messages received over the access channel and a number of messages that failed the CRC.

22. The device of claim 21, wherein the number of messages that failed the CRC includes at least one of access messages that arrive at the device at substantially the same time during a time when the access channel does not meet the overload criteria, access messages colliding due to the access channel meeting the overload condition and a low uplink radio frequency ("UL-RF") condition.

23. The device of claim 13, wherein the number of RAR message failures includes at least the sum of the number of RAR messages having a back-off indication and a number of RAR messages that could not be scheduled.

24. The method of claim 23, wherein the plurality of overload levels are ranked from a lowest overload level to a highest overload level, the higher overload level restricting access to the access channel more than the lower overload level.

25. A device for use in a communication network, the communication network having an access channel, the device comprising:
   a memory, the memory storing access class ("AC") barring parameters, the AC barring parameters establishing rules to determine whether to transmit an access message on the access channel;
   a processor, the processor:
      determining whether the access channel is in an overload condition, the overload condition being based at least in part on access channel characteristics indicating whether a user device has been able to establish a communication connection; and
   a transmitter, the transmitter transmitting a value of at least one AC barring parameter in response to determining whether the access channel is in the overload condition;
   the access channel characteristics including at least one of a ratio of received messages to access channel capacity, a number of messages failing a cyclic redundancy check ("CRC") and a number of random access response ("RAR") message failures; and
   the memory further stores an overload criteria, the overload criteria defining minimum AC barring parameter values, the overload criteria being met when the ratio of total received messages to access channel capacity exceeds a first minimum AC barring parameter value and the number of messages failing the cyclic redundancy check ("CRC") exceeds a second minimum AC barring parameter value.

26. The device of claim 25, wherein the total received messages include at least a sum of a number of valid messages received over the access channel and a number of messages that failed the CRC.

27. The device of claim 26, wherein the number of messages that failed the CRC includes at least one of access messages that arrive at the device at substantially the same time during a time when the access channel does not meet the overload criteria, access messages colliding due to the access channel meeting the overload condition and a low uplink radio frequency ("UL-RF") condition.

28. A device for use in a communication network, the communication network having an access channel, the device comprising:
   a memory, the memory storing:
      access class ("AC") barring parameters, the AC barring parameters providing rules to determine whether to transmit an access message on the access channel; and
      an overload criteria, the overload criteria defining minimum AC barring parameter values, the overload criteria being met when the ratio of total received messages to access channel capacity exceeds a first minimum AC barring parameter value and the number of messages failing the cyclic redundancy check ("CRC") exceeds a second minimum AC barring parameter value; and
   a processor, the processor:
      determining whether the access channel is in an overload condition, the overload condition being based at least in part on access channel characteristics indicating whether a user device has been able to establish a communication connection; and
   a transmitter, the transmitter transmitting a value of at least one AC barring parameter in response to determining whether the access channel is in the overload condition;
   the access channel characteristics include at least one of a ratio of received messages to access channel capacity, a number of messages failing a cyclic redundancy check ("CRC") and a number of random access response ("RAR") message failures;
   the overload criteria is met when the number of random access response ("RAR") message failures exceed a third minimum AC barring parameter value; and
   the number of RAR message failures includes at least the sum of the number of RAR messages having a back-off indication and a number of RAR messages that could not be scheduled.

29. The method of claim 28, wherein the plurality of overload levels are ranked from a lowest overload level to a highest overload level, the higher overload level restricting access to the access channel more than the lower overload level.

30. A method of adaptively controlling access channel overload in a Long Term Evolution (LTE) communication network, the method comprising:
   determining whether an access channel of the LTE communication network is in an overload condition;
   determining a first value of at least one access class ("AC") barring parameter in response to determining whether the access channel is in the overload condition, the at least one AC barring parameter establishing rules allowing access to the access channel of the LTE communication network at a reduced access rate for at least one service, the at least one AC barring parameter including a parameter to establish service based limitations that limit a rate at which lower priority services are accessed while still allowing access to services with a priority greater than the lower priority services;
   transmitting an update message, the update message including the determined first value of at least one AC barring parameter, the at least one AC barring parameter providing at least one rule to determine whether to transmit an access message on the access channel; and
   monitoring whether the access channel continues to be in the overload condition after transmitting the update message.

31. The method of claim 30, further comprising:
determining a second value of at least one AC barring parameter in response to the monitoring; and
transmitting the determined second value of the at least one AC barring parameter, the determined second value superseding the first value of at least one AC barring parameter.

32. The method of claim 30, further comprising determining a first overload level from a plurality of overload levels in response to the access channel being in the overload condition, a value of the at least one AC barring parameter being defined based on the first overload level.

33. The method of claim 31, wherein the existence of the overload condition is based at least in part on access channel characteristics indicating whether a user device has been able to establish a connection with a device in the LTE communication network.

34. The method of claim 33, wherein the access channel characteristics includes at least one of a ratio of receive messages to access channel capacity, number of messages failing a cyclic redundancy check ("CRC") and a number of random access response ("RAR") message failures.

* * * * *

UNITED STATES PATENT AND TRADEMARK OFFICE
CERTIFICATE OF CORRECTION

PATENT NO.         : 8,797,858 B2                                    Page 1 of 1
APPLICATION NO.    : 13/343526
DATED              : August 5, 2014
INVENTOR(S)        : Ye et al.

It is certified that error appears in the above-identified patent and that said Letters Patent is hereby corrected as shown below:

In the Drawings

Figure 5:
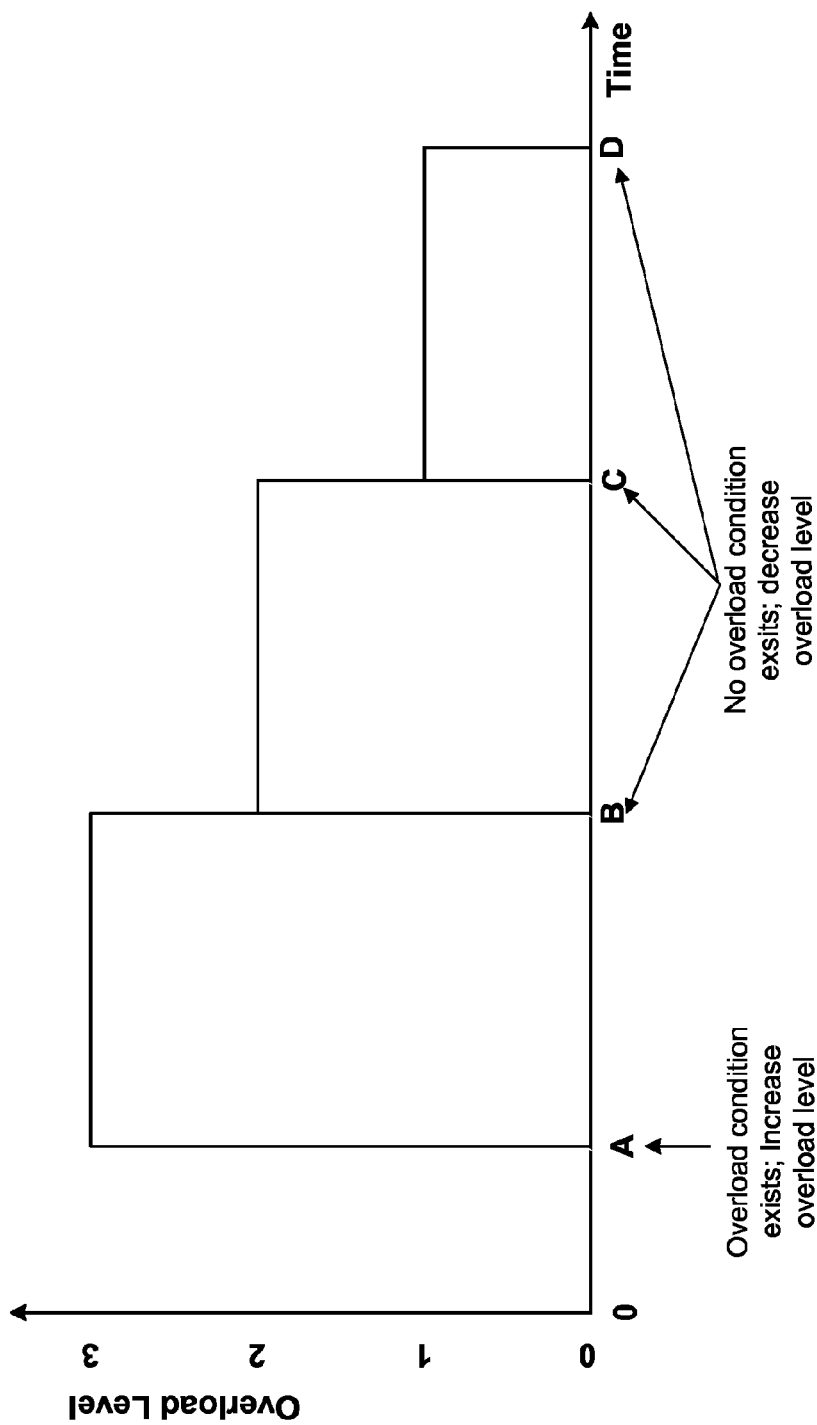
FIG. 5 is a chart showing an example of the access channel overload adaptation process in accordance with the principles of the present invention.
Figure 6:
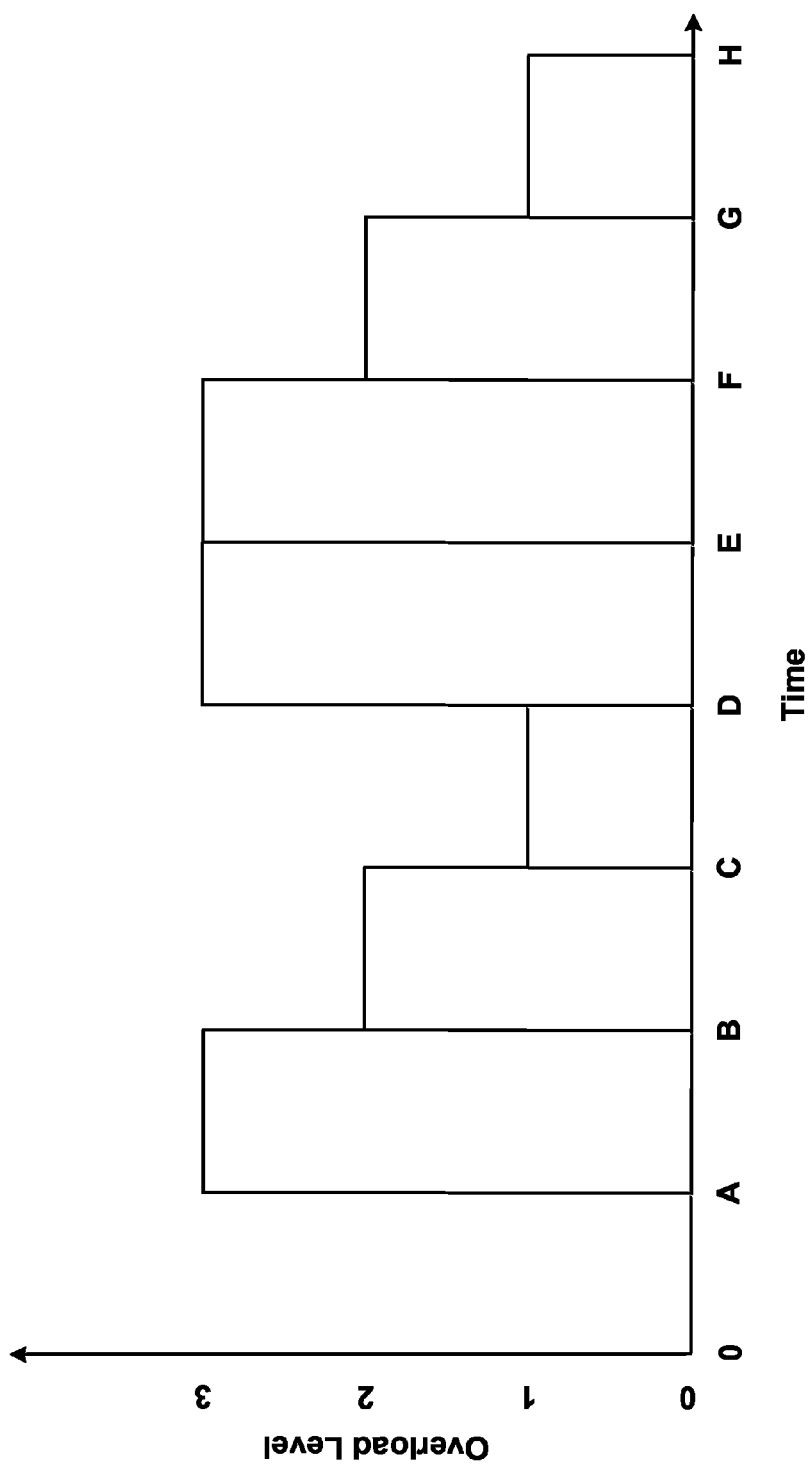
FIG. 6 is a chart showing another example of the access channel overload adaptation process in accordance with the principles of the present invention.

In Fig 5, Sheet 5 of 6, delete "exsits;" and insert -- exists; --, therefor.

In the Claims

In Column 16, Line 56, in Claim 17, delete "method" and insert -- device --, therefor.

In Column 16, Line 59, in Claim 18, delete "method" and insert -- device --, therefor.

In Column 16, Line 62, in Claim 19, delete "method" and insert -- device --, therefor.

In Column 17, Line 25, in Claim 24, delete "method" and insert -- device --, therefor.

In Column 18, Line 39, in Claim 29, delete "method" and insert -- device --, therefor.

Signed and Sealed this
Sixteenth Day of June, 2015

Michelle K. Lee
*Director of the United States Patent and Trademark Office*